(12) United States Patent
Huffman et al.

(10) Patent No.: US 12,379,310 B2
(45) Date of Patent: Aug. 5, 2025

(54) OPTICALLY SUPER-RESOLVED INFRARED IMPULSE SPECTROSCOPY (OSIRIS)—A TECHNIQUE FOR HIGH CONTRAST CHEMICAL IMAGING OF CHEMICAL COMPOSITION

(71) Applicant: The Government of the United States of America, as represented by the Secretary of the Navy, Arlington, VA (US)

(72) Inventors: Tyler Huffman, Alexandria, VA (US); Robert Furstenberg, Burke, VA (US); Chris Kendziora, Burke, VA (US); R. Andrew McGill, Lorton, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 157 days.

(21) Appl. No.: 18/096,250

(22) Filed: Jan. 12, 2023

(65) Prior Publication Data

US 2023/0221247 A1     Jul. 13, 2023

Related U.S. Application Data

(60) Provisional application No. 63/298,724, filed on Jan. 12, 2022.

(51) Int. Cl.
*G01N 21/3563*     (2014.01)

(52) U.S. Cl.
CPC . *G01N 21/3563* (2013.01); *G01N 2201/0636* (2013.01)

(58) Field of Classification Search
CPC ....... G01N 21/3563; G01N 2201/0636; G01N 2021/1712; G01N 21/171
See application file for complete search history.

(56) References Cited

U.S. PATENT DOCUMENTS

| 2005/0105099 A1* | 5/2005 | Shpantzer | G01N 21/171 |
| | | | 356/517 |
| 2018/0180642 A1* | 6/2018 | Shetty | G01Q 30/025 |
| 2019/0317012 A1* | 10/2019 | Furstenberg | G01N 21/1717 |

\* cited by examiner

*Primary Examiner* — Carolyn Fin
(74) *Attorney, Agent, or Firm* — US Naval Research Laboratory; Rebecca L. Forman

(57) ABSTRACT

The present invention provides a method for spectroscopic imaging by illuminating a sample with a short infrared pulse, directing one or more probe beams to the sample, and measuring light that is reflected, transmitted, or re-emitted inelastically, where a spectrum is collocated by varying the wavelength of the infrared pulse and an image is collected by moving the sample and probe beam relative to each other as the steps are repeated multiple times to create a multidimensional spectroscopic image of the sample. Also disclosed are the related methods for analyzing the data and the related system for spectroscopic imaging.

11 Claims, 10 Drawing Sheets

Measurement Model

In model notation:

$$\underbrace{\Omega_{x\lambda}}_{Osiris\ data} - \underbrace{M_{xa}}_{\substack{Map\ of\ analytes'\\ abundance}} \underbrace{S_{a\lambda}}_{\substack{Spectra\ of\\ each\ analyte}} \sim Normal(0, \sigma^2)$$

English:
Symmetric Gaussian Noise of standard deviation $\sigma$ to be inferred

Assumptions

| In model notation: | In English: |
|---|---|
| $m_{xa} \sim \exp(\bar{\mu})$ | The elements of M and S > 0 |
| $s_{a\lambda} \sim \exp(\bar{s})$ | with specified scales $\bar{\mu}$ and $\bar{s}$ |
| $\sigma^2 \sim Gamma^{-1}(k, theta)$ | Nonzero Measurement Noise (weakly constrained by $k$ and $theta$) |

FIG. 5

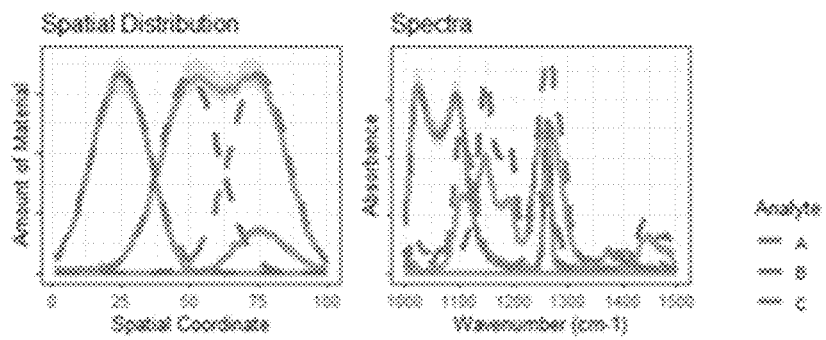
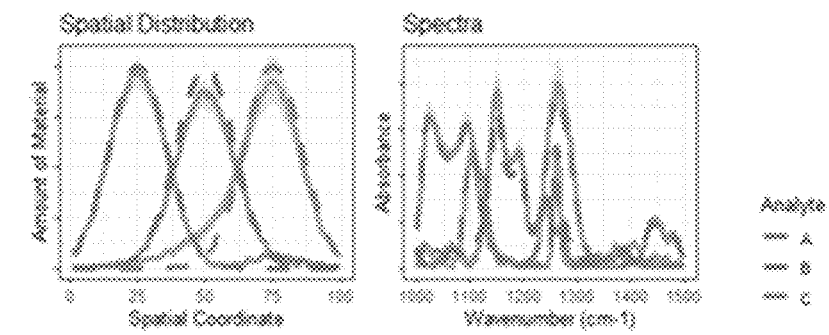
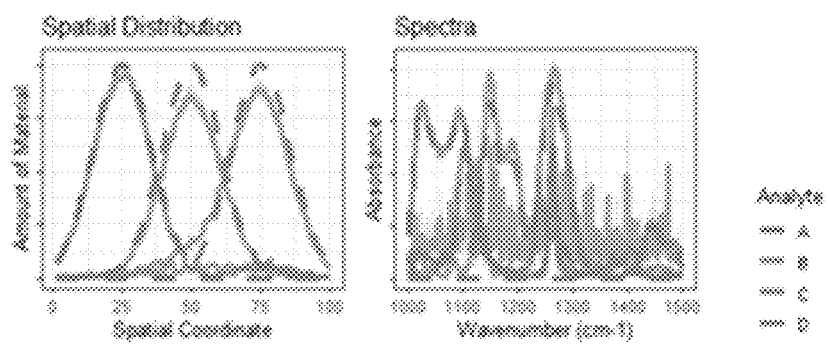
FIG. 7

OPTICALLY SUPER-RESOLVED INFRARED IMPULSE SPECTROSCOPY (OSIRIS)—A TECHNIQUE FOR HIGH CONTRAST CHEMICAL IMAGING OF CHEMICAL COMPOSITION

PRIORITY CLAIM

The present application is a non-provisional application claiming the benefit of U.S. Provisional Application No. 63/298,724, filed on Jan. 12, 2022 by Tyler J. Huffman et al., entitled "OPTICALLY SUPER-RESOLVED INFRARED IMPULSE MICRO-SPECTROSCOPY: A TECHNIQUE FOR RAPID, HIGH CONTRAST LABEL-FREE CHEMICAL IMAGING." This application and all other publications and patent documents referred to throughout this nonprovisional application are incorporated herein by reference in their entirety.

BACKGROUND OF THE INVENTION

Field of the Invention

The present invention relates to spectroscopic imaging.

Description of the Prior Art

There has been significant recent interest in a novel microscopy technique wherein the change in the signal of a short wavelength scanning confocal probe is measured as the sample is heated by a modulated infrared laser. This signal, denoted $\Omega$, is related to both the probe intensity and the infrared induced change in temperature (See FIG. 1.). In this way, the chemical composition of the sample-through the infrared absorption spectrum $k(\lambda)$—is revealed at optical resolutions. A high duty cycle infrared (IR) pump, typically a Quantum Cascade Laser, ~5%-50% duty cycle1, 100-500 kHz repetition rate—has been used. The signal $\Omega$ is extracted in the frequency domain via demodulation of the continuous wave (CW) probe signal.

Virtual lock-in demodulation, has been used to increase the image acquisition rate, at some cost of spatial resolution. Virtual lock-in detection works by strobing (flashing) the probe to capture images on a camera array with higher temporal resolution than the camera would typically be capable of. The signal $\Omega$ can be inferred by comparing images where the infrared pump is both on and off. The increase in speed is provided by the highly parallel acquisition provided by the camera array. However, this increase in speed comes at the cost of the confocality, which is desirable for increased resolution, particularly in 3D imaging (tomography).

Collectively, these approaches, which has come to be known as Mid Infrared Photothermal (MIP) imaging, has demonstrated the potential to access a regime that has long been considered something of a holy grail for microscopy-real-time label-free chemical microscopy in biological samples. However, significant challenges persist. The sensitivity is limited, particularly when imaging resolution scale objects. The dependence of the signal on the inclusion size and fractal dimension complicates the data analysis greatly; thus far, there is no method to extract the chemical composition (concentration) from the measured data. It seems likely that such analysis will remain intractable with the existing experimental techniques/hardware. This is of particular concern since the raw data $\Omega(x, y, z, t, \lambda)$, is difficult to visualize. Moreover, it lacks the intuitive character that typically makes imaging techniques so powerful. This unintuitive aspect is amplified when the sample is not substantially known a priori.

BRIEF SUMMARY OF THE INVENTION

The high-duty cycle approach used in MIP is inconsistent with the thermal transport within the sample. This not only results in the MIP technique having low sensitivity, but it also results in small inclusions within the sample heating less than large inclusions. The result is that the signal depends not only on the chemical composition of the sample at a given pixel, but also the surrounding composition. Because of this complication, there is no clear method to extract the chemical composition from the MIP image.

The present invention provides for a low duty cycle (pulsed) technique, called Optically Super-resolved Infra-Red Impulse Spectroscopy (OSIRIS), to overcome the sensitivity and analysis challenges inherent in MIP. OSIRIS differs from MIP in the following ways:

An infrared pulse, which is short compared to the thermal time constant of resolution scale objects within the sample. This results in heating that is proportional to the analyte's absorptivity and concentration, and NOT of the size of the analyte inclusion or its surroundings. This makes it possible to extract the concentration directly from the OSIRIS signal $\Omega$.

The pump pulses are much less frequent to allow the sample to return to equilibrium after each pulse. The resulting duty cycle D is fundamentally tied to the pump $\lambda_{IR}$ and probe $\lambda_{probe}$ through this relation:

$$D \leq \frac{\lambda_{probe}^2}{5.2\lambda_{IR}^2} \approx 0.03\%.$$

Thus, the proper duty cycle is more than 100 times smaller than that used in MIP.

Since all interesting physics occur during or shortly after the pump pulse, the probe is preferably pulsed to avoid unnecessary damage or phototoxicity to the sample while the pump is off and the sample is simply cooling back to equilibrium.

The detector must have sufficient temporal resolution to observe resolution scale objects during the very short time they are heated (~20 ns).

The signal processing now takes place in the time domain, which is more appropriate for low duty cycle signals. This contrasts with the frequency-domain demodulation used in MIP, which is more appropriate for high duty cycle signals. Optionally, this time domain signal can be analyzed to reveal the chemical composition of surrounding pixels to increase spatial resolution and/or image acquisition rate.

The primary advantage of OSIRIS is that it can be analyzed to extract concentrations in a straightforward manner. Thus, in addition to the OSIRIS technique itself, we describe analysis methodology to extract the relative concentrations of analytes within the sample. Moreover, we describe a method to infer information about the area surrounding the probe by analyzing the time-domain signal.

Definitions

An inclusion is a volume of material which differs from the surrounding medium.

The duty cycle is a concept that is typically used to describe the square waves of digital signals. However, the relative fraction of high vs. low signals is a concept that is equally relevant for analog waveforms. Here, the duty cycle is used in this broader sense.

The thermal diffusion time constant characterizes the timescale required for heat to flow from one end of a rod held at temperature T to the other end of the rod. This is most notable because it provides a limit for the maximum length of a pulse before the spatial resolution is compromised. This is conventionally characterized by the time it takes for the unheated end of the rod to heat to $1/e \approx 63\%$ of the temperature of the heated end, roughly $$\frac{length^2}{resolution}.$$

The cooling time constant characterizes the timescale on which a heated inclusion cools to equilibrate with the surrounding sample medium. Conventionally, this is the time required for the inclusion to cool to $1/e \approx 37\%$ of some initial excess temperature. It is notable because it sets a limit on the maximum length of a pulse before contrast is compromised. Since in a real sample the heat can flow in 3 dimensions, this is much less than the thermal diffusion time constant; This can be seen by considering that the 63% of the heat that flows out of the inclusion in one cooling time constant only heats each neighboring pixel roughly $63\%//27 \approx 2\%$.

Re-emitted inelastically refers to light that is inelastically scattered. Examples include fluorescence and Raman scattering.

A signal trace is a time series of measured values. It is typically used here to refer to the measured intensity of the probe beam unless otherwise specified.

The term probe thermometry or simply thermometry is used to describe the complicated correspondence between the probe signal level and the temperature of the sample. This correspondence is a complicated function of the initial degree of focus of the probe beam, the sample geometry, and how the refractive index of the sample changes as a function of temperature. We refer to The methods of determining the correspondence based on some experimental input is referred to as "calibrating the probe thermometry".

A spectrum is a function whose domain is an energy. Here, reference is made to the infrared spectrum, where the domain is the photon energy of the infrared light, or equivalent measure such as wavelength or frequency.

A spectrogram is a dataset where a spectrum is measured at various spatial points, or at different times, or both.

Spectral de-mixing is a method for analyzing a spectrogram to extract the distinct spectral components and their relative contributions at each measured spatial or time coordinate in the spectrogram. The canonical example of spectral de-mixing is colloquially referred to as the "Cocktail Party Problem" in which the task is to identify the words spoken by several individuals as a party based on the data recorded by several microphones placed around the room. Several standard methods exist such as Principal Component Analysis (PCA), Independent Component Analysis (ICA) and Non-negative Matrix Factorization (NMF). Generally, the goal of spectral de-mixing is to extract two matrices, the spectral matrix-which tabulates the distinct spectra- and the mixing matrix-which tabulates the relative contribution of each spectra at the spatial or temporal locations measured in the spectrogram.

Non-Negative Matrix Factorization (NMF) is a method of spectral de-mixing wherein the values of the spectral matrix and the values of the mixing matrix are assumed to be positive.

A Bayesian approach is an analysis which quantifies the statistical uncertainty in some unmeasured variable or variables based on one or more measured variables. Optionally, some prior knowledge or expectation about the unmeasured variables is included in the analysis. Bayesian approaches include, but are not limited to, Markov-Chain Monte-Carlo methods.

Undersampling is the process collecting an image at a lower spatial resolution than ultimately desired, which permits increased image acquisition rate at the cost of some additional uncertainty, particularly at points that weren't sampled directly.

Upsampling is a process of data analysis that allows an image at the desired resolution to be inferred from the undersampled image.

These and other features and advantages of the invention, as well as the invention itself, will become better understood by reference to the following detailed description, appended claims, and accompanying drawings.

BRIEF DESCRIPTION OF THE DRAWINGS

FIG. 5 shows the Bayesian NMF model. The assumptions are incorporated into the model using "maximum entropy distributions." For those unfamiliar with model notation, the plain English interpretation is included explicitly. Note that the tilde should be read as "distributed as."

FIG. 7 shows inferred results as a function of model order. Note that models of incorrect order are quite weak, at least for this synthetic data. The order=2 model (top) has a very high (bad) Bayesian information criterion (BIC), indicative of a poor fit (likelihood) of the data. The order=4 model (bottom) the "extra" component is primarily noise. The correct order=3 model (middle) has the best (lowest) BIC.

DETAILED DESCRIPTION OF THE INVENTION

Figure 1:
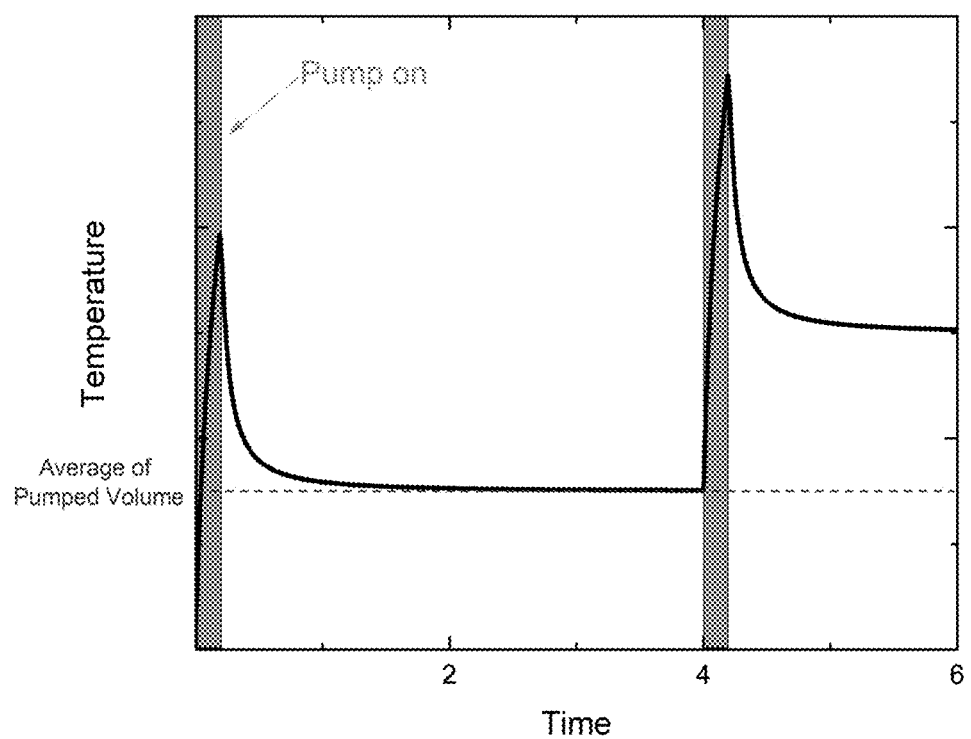
FIG. 1 is a graph showing simulated temperature at the center of a moderately sized inclusion after successive IR pump pulses.

The present invention provides a method for spectroscopic imaging. According to this method, a sample is illuminated with a short infrared pulse that is shorter than or equal to the thermal cooling time constant of resolution scale inclusions within the sample to induce a temperature change independent of inclusion size or surface area (fractal dimension). Then one or more probe beams are directed to the sample such that it is incident within the area heated by the infrared pulse, and wherein the one or more probe beams has a shorter wavelength than the infrared pulse. Light that is reflected, transmitted, and/or re-emitted inelastically is measured for each probe beam to deduce the infrared induced heating. These steps (illuminating sample with an infrared pulse, directing probe beam to the sample, and measuring the light) are repeated multiple times with varying wavelengths of the infrared pulse and with the sample and the probe beams being moved relative to each other. This allows for the collection of a multidimensional infrared spectroscopic image of the sample, which characterizes the chemical makeup of the sample.

In a preferred embodiment, a pulse period of the infrared pulse is long compared to the thermal cooling time constant of the area heated by the infrared pulse, wherein the sample cools fully before the next infrared pulse. In another preferred embodiment the probe beam wavelength is in the range of 400 to 700 nm. In yet another preferred embodiment, the probe beam is modulated to only illuminate the sample at times within a few hundred nanoseconds of the infrared pulse to limit damage to the sample caused by the probe beam. In another preferred embodiment, a probe signal trace during the infrared pulse is used to exploit the constant rate of heating during the infrared pulse to calibrate the complicated relationship between the probe signal level and the temperature of the sample-what we call "probe thermometry".

The present invention also provides methods for analyzing the data. Spectrum data can be analyzed using spectral de-mixing, such as non-negative matrix factorization (NMF), to extract locations and spectra of distinct analytes within the sample, and a Bayesian approach can be employed to quantify the uncertainty of the data analysis. The measured light can be analyzed in the time domain, such as by photothermal GPS (deconvolution) or the inverse operation (convolution) on some proposed model of the sample, to infer information about the one or more probe beams and the surrounding area either to reduce the uncertainty of the collected image or upsample an undersampled image, and a Bayesian approach can be employed to quantify the uncertainty. A time domain analysis can be combined with spectral de-mixing to extract concentration maps. This could be applied in fully sampled images to reduce uncertainty, or in undersampled images to increase the data acquisition rate at the cost of increased uncertainty. Again, a Bayesian approach can be employed to quantify the uncertainty. Infrared pump optical probe images can be analyzed using non-negative matrix factorization (NMF) to extract locations and spectra of distinct analytes within the sample, and a Bayesian approach is used to quantify the uncertainty implicit in the data analysis.

This invention also provides a system for spectroscopic imaging. The system includes a pulsed infrared light source, an optical system for generating one or more probe beams, means for directing the infrared light source and one or more probe beams to a sample, a device for moving the one or more probe beams and the sample relative to each other, light detectors and filtering optics for the one or more probe beams, digitization electronics for the probe beams, and a computer with control software to collect, process, analyze and display relevant information. In a preferred embodiment, the means of directing the infrared light source and probe beams may be mirrors, lenses, or both. In another preferred embodiment, the pulsed infrared light is produced by nonlinear optics as in an optical parametric oscillator (OPO) or optical parameteric amplifier (OPA). In yet another preferred embodiment, multiple probe beams are generated by a diffractive optic, such as a spatial light modulator. In another preferred embodiment, the sample is moved relative to the one or more probe beams via a motion stage and/or the probe beams are moved relative to the sample via a scan mirror. In yet another preferred embodiment, the light detector is a photomultiplier tube or an array of photomultiplier tubes, an avalanche photodiode or an array of avalanche photodiodes, or a photodiode or an array of photodiodes. In a preferred embodiment, the digitization electronics have temporal resolution greater than or equal to the cooling time constant of resolution scale objects. In another preferred embodiment, the light detection is performed interferometrically by splitting the probe beams into two paths, one of which, the "sample arm", going to the sample before being combined with the other arm, the "reference arm", at the light detector, wherein either arm length is controlled by a piezo motion stage or by other means to cause destructive interference at the detector to reduce the shot noise associated with detecting the one or more probe signals.

Notional Design

A notional design is presented, supported by argument and simulation, of the ideal way to overcome the infrared diffraction limit with an optical probe. All simulations of thermal properties assume water as a medium, since aqueous samples are the primary application for OSIRIS. The thermal diffusivity a of water is similar to that of other organics. Inorganic materials generally have much higher thermal diffusivities that make the low-duty cycle of OSIRIS even more attractive. Finally, a schematic implementation of OSIRIS is presented in both reflection and transmission geometries.

The OSIRIS signal is related to both the magnitude of temperature change induced by the pump $\Delta T$ and the intensity of the probe beam. That in most cases the temperature change results in some small perturbation in the optics of the probe implies the following relation:

$$\Omega \propto I_{probe} \Delta T$$

This relation is true with the caveat that the proportionality constant is itself a complicated function of the optical configuration (i.e. reflection or transmission mode, confocality, etc.), the thermo-mechanical and thermo-optic properties of the sample, and the degree of focus of the imaging system.

It is instructive to first consider what happens when the sample is illuminated by repeated infrared pulses. The general case of an infrared absorbing inclusion within a medium is presented in FIG. 1. While the inclusion initially heats rapidly in response to the pump, it is not linear due to heat transfer out of the inclusion. Once the pump is turned off, the inclusion cools until it reaches equilibrium with its surroundings-primarily the volume heated by the infrared pump. The pumped volume will eventually equilibrate back to the ambient temperature, but in principle the equilibrium temperature of the pumped volume increases with successive pulses. Since this increased heating is of absorbent (on resonance) inclusions within the infrared spot is the fundamental physical process being attempted to measure with the probe to beat the diffraction limit, the best experimental method takes this physics and the associated timescales into account.

Assertion 1—The Infrared Pulses should be Shorter than the Cooling Time Constant of Resolution Scale Objects.

Generally speaking, the size and shape (fractal dimension) of inclusions will vary considerably within and between samples. The cooling time of a given inclusion, $\tau$, depends greatly on its size and shape. The cooling time for resolution scale spherical objects, $\tau_{res}$, is on the order of 20 ns in water. As the size of the inclusion increases, the cooling time scales quadratically, which follows from the heat transport equation:

$$\frac{\partial T}{\partial t} = \alpha \nabla^2 T \rightarrow \text{size} \propto \tau^2.$$

The cooling of a feature is related to the fraction of available space into which to cool (relative to its size). For example, a small spherical inclusion can cool into all 3 directions. A thin line can cool into 2 dimensions (i.e. in the plane perpendicular to its axis) and so on. The more dimensions the cooling can proceed into, the faster the particle will lower its temperature and so it becomes critical to excite the heating with very short pulses. Moreover, inclusions with complex surfaces will cool faster than inclusions with low surface area for their volume, such as a sphere. This complexity can be characterized by the "fractal dimension" of the inclusion.

Figure 2:
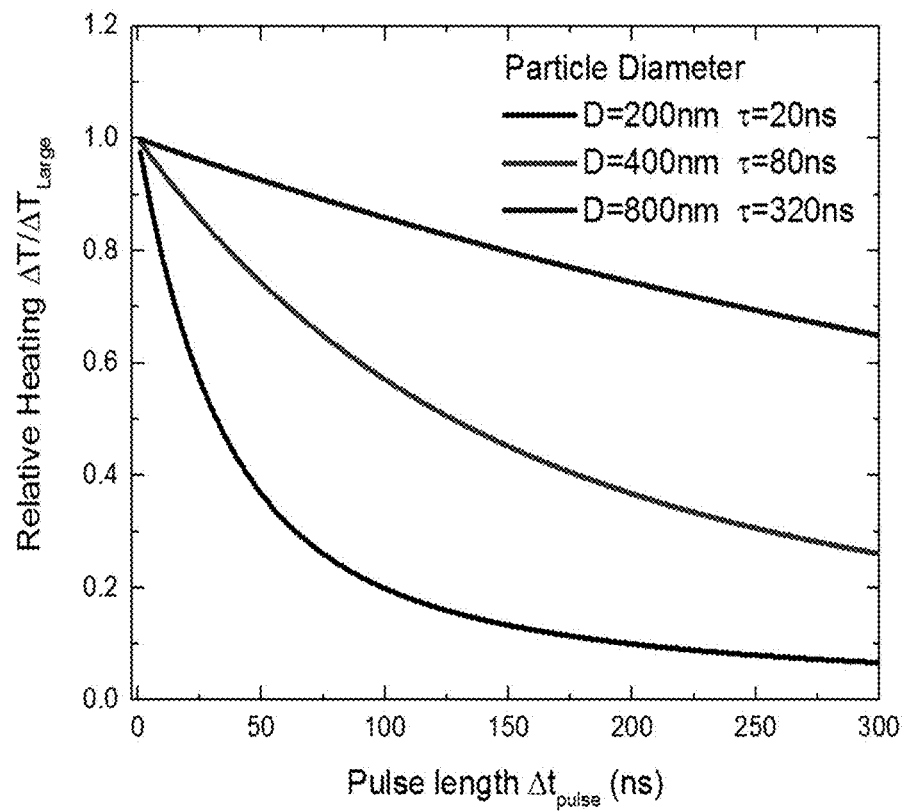
FIG. 2 is a graph showing relative heating simulated for infrared pulse lengths incident on spheres of various diameters in water when pulse energy is held constant.

FIG. 2 shows how distributing the same pulse energy over finite time effects the induced heating for various particle sizes. Note that small particles heat much less than large particles unless the pulse length is very short. This effect is formalized by the following relationship, which results from convolving a square pulse with the exponential cooling of the inclusion:

$$\Omega \propto I_{probe} \Delta T \propto k(\lambda) P_{pulse} \tau \left(1 - e^{\frac{-\Delta t_{pulse}}{\tau}}\right) \xrightarrow[\Delta t \ll \tau]{} k(\lambda) E_{pulse}^{IR} \rightarrow \sigma(\lambda) C E_{pulse}^{IR}$$

Thus, the experimental advantage of using pulses that are short relative to $\tau_{res}$ is clear: the OSIRIS signal will not depend on the size or shape of the inclusion through $\tau$. Instead, the OSIRIS signal will depend on the absorption $k(\lambda)$, which is proportional to the concentration C of the analyte and its characteristic infrared cross section $\sigma(\lambda)$. This simplifies the data analysis.

Assertion 2—Each Pulse should Heat the Sample Near the Damage Threshold, after which the Sample Must be Allowed to Cool in Preparation for the Next Pulse.

Recall from FIG. 1 that successive pulses can increase the temperature of the pumped volume appreciably if they occur rapidly relative to the cooling time of the pumped volume $\tau_{IR}$. The pumped volume is a large volume that can be heated considerably after many pulses. While the degree of heating is of course highly dependent on sample composition and pump power, it is certainly possible to damage many samples with a modern infrared laser source under the high Numerical Aperture of a microscope objective. By approximating the heated volume as a sphere with the same diameter as the IR spot, it is found that $\tau_{IR}$ is at least $$\left(\frac{2\lambda_{IR}}{\lambda_{probe}}\right)^2$$

times larger than $\tau_{res}$ for a diffraction limited probe $$\left(\text{resolution} \sim \frac{\lambda_{probe}}{2}\right).$$

Figure 3:
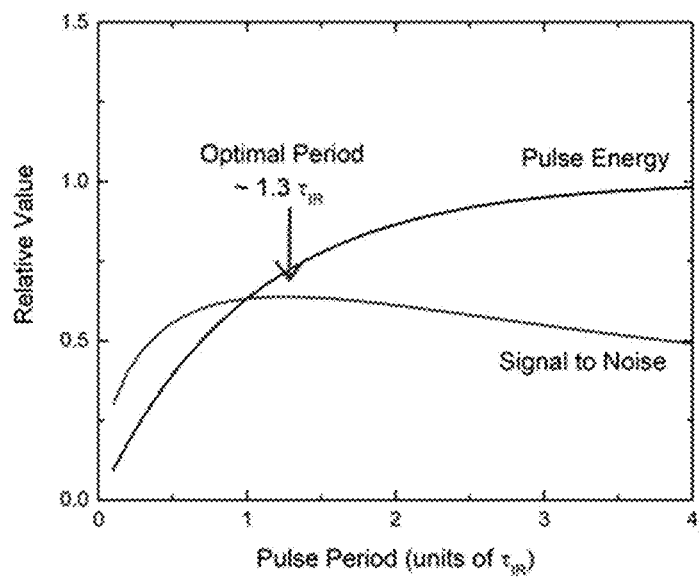
FIG. 3 is a graph showing estimated relative pulse energy required to reach damage threshold and resulting relative SNR in the presence of shot-(random) noise. Detection that is not shot noise limited is worse for short pulse periods.

For the current experimental setup, the $$\left(\frac{2\lambda_{IR}}{\lambda_{probe}}\right)^2$$

factor is roughly 2500. Thus, $\tau_{IR}$ is on the order of 50 µs in water. Although at first glance this seems like an unacceptably long time to wait after each pulse, note that letting the sample relax permits heating to the damage threshold by each pulse. That this is desirable can be seen from the fact that the signal to noise will be roughly linear in $E_{pulse}$, while it is only proportional $\sqrt{N_{pulses}}$ in the best case of shot-noise limited detection. Thus, one should always demand more than 4 pulses in exchange for a pulse that is half as intense. As such derating of the pump is necessary to avoid the damage threshold, it is plausible that fewer, more intense pulses could provide some benefit. Of course, the pulse period $T_{pulse}$, must be finite to permit co-adding to improve signal to noise, or to collect a nearby point. In the case of a finite period, the pulse energy must be decreased by a factor of $$\frac{1}{1 - e^{-T_{pulse}/\tau_{IR}}}$$

to remain below the damage threshold. Given the assumption of shot-noise limited detection, the effect of different periods on SNR—each with appropriate pulse energy to reach damage threshold is shown in FIG. 3. Clearly, the optimal pulse period is somewhere around $1.3\tau_{IR}$.

These long periods provide an additional optical advantage. The successive heating after each pulse causes the sample to expand towards the objective, which means that the probe interrogates a slightly different position in the sample after each pulse. Consider a 100 micron thick sample with a coefficient of thermal expansion around 100E−6/K, which is reasonable proxy for water and various organics. The surface of the sample moves 10 nm per degree kelvin that it is heated. Certainly, in this situation, it is quite possible that the sample moves several pixels between the first pulse and whenever some steady—state is established. Such movement would not only compromise the resolution in the z direction, but also change the focus significantly, particularly in reflectance mode. For example, if the microscope focus is very slightly above the sample surface for a measurement, the first pulse will improve the focus, which will result in a peak in the probe detector signal. After several pulses, the focus could be precisely at the sample surface, or even slightly below. Then, each pump pulse would instead result in troughs—not peaks like before—in the probe signal. Such sign changes would cause real problems for the simple demodulation used in the MIP method.

The pump duty cycle for this type of microscopy most consistent with the thermal dynamics is related to the wavelengths of the pump and probe, where the 5.1 in the denominator comes from the diffraction limit and the optimum pump period being 1.3 $\tau_{IR}$.

$$D \le \frac{\lambda_{probe}^2}{5.2\,\lambda_{IR}^2}$$

For the current pump and probe wavelength, the duty cycle should be less than 300 ppm. The consequences of this low duty cycle will echo through the rest of the instrument design.

Assertion 3—The Probe should be Pulsed

Note that the most interesting data points are before the pulse to establish a baseline, and at the peak temperature to quantify the induced change. Several units of $\tau_{res}$ later, the inclusion will equilibrate with the medium and any hope of meaningful microscopy is lost. Thus, except for a brief instant slightly before and after the pump pulse, perhaps 100 nanoseconds all-told, probe light is a detriment. In the best case, this probe light is an additional heat load on the sample. A worse case is possible at the short probe wavelengths that permit the maximum resolution, because the photon energy can be sufficiently high to alter the chemistry of the sample. In biological systems, this is referred to as photo-toxicity for obvious reasons. As this sort of damage is non-reversible, it is very different from the thermal damage threshold that we were concerned about with the pump. This means that there will be some limit of probe photons that can illuminate each pixel of the sample over the entire experiment. If we pulse the probe at a duty cycle that is 6 times larger than the pump duty cycle, we can increase the number of usable photons by roughly 500 times. Given shot-noise limited detection of the probe, this will increase the signal to noise by a factor of $\sqrt{N_{probephotons}}$=22. Thus, pulsing the probe has immense consequences, potentially resulting in roughly 22 times more sensitivity.

Assertion 4—Multi-Channel Operation is Critical for Imaging Dynamics

This is necessary to address the reality that the image acquisition rate of OSIRIS is limited to one pixel per pump pulse. In water, this limits the pixel acquisition rate to 10 kHz at full sensitivity, which is not sufficient for video like imaging. The optimistic scenario would still place the pixel acquisition rate around 270 kHz. This would be sufficient to image a 300 pixel square image at 3 spectral points in a second. Note that this fundamental limit for the pixel acquisition rate of OSIRIS is quite slow; for studying chemical dynamics, one would want to be able to sample more spectral points—at least 10—at a higher framerate—perhaps 20 frames per second. This can be addressed by splitting the probe beam into multiple channels with a diffractive optic or spatial light modulator and using multiple data acquisition channels. To fill the diffraction limited pump spot with sufficient spacing requires approximately 61 probes. For each probe, there are effectively 7 distinct spots on the confocal plane for coherent detection (0.33 Airy diameter detection fibers). Thus, the potential improvement from multiplexing is huge. In principle, so long as the pump energy is sufficient to expand the pump spot, there is no real limit on the number of detection channels. However, while the pixel acquisition rate is linear in the number of detection channels, there are significant diminishing returns on how additional probes increase the object size that can be studied at full resolution. The high bandwidth requirement of OSIRIS results in a significant marginal cost per channel. Thus, the practical limit to channel count depends on the implementation and the application.

Assertion 5—Signal Processing should Take Place in the Time Domain

The essential idea of demodulation is to project the raw time-domain signal onto a sinusoidal basis set. The resulting output—the frequency domain signal—can be a more intuitive way to analyze highly periodic signals. Historically, demodulation had advantages in terms of isolating a weak signal from a noisy background because the noise could be averaged out via an analog low-pass filter. However, modern lock-in amplifiers, which are perhaps the most sensitive demodulation tool, are digital instruments which first collect the raw time-domain signal before performing the appropriate complex Fourier transform. Since the raw time-domain signal will be collected anyway, it is natural to ask whether demodulation, or some other algorithm, is the most appropriate way to analyze the OSIRIS data.

For MIP experiments, where duty cycles range from 5%-50% duty cycle, demodulation at the first harmonic has been used successfully. However, as the duty cycle decreases, the Fourier components are distributed over higher harmonics. Consider the case of a 5% duty cycle square pulse. For this case, which is a far higher duty-cycle than is appropriate for OSIRIS, the Fourier coefficient at the first harmonic is roughly 8% of the amplitude of the pulse. It follows that simple demodulation for low duty cycle waveforms results in lower signal and sacrifices information that is contained in the higher harmonics. In the high-duty cycle MIP regime, the disadvantages of first harmonic demodulation have thus far been accepted because of its usefulness in compressing the complicated waveform into a single number. However, in the low duty cycle regime of OSIRIS, the time-domain signal provides increased information in a more intuitive form that we can put to good use. Two approaches could prove useful:

1) Thermometry Calibration—The probe is a poor thermometer. Whether the signal on the photodetector increases or decreases depends on whether the pump induced heating improves the focus. The photodetector signal may even be non-monotonic with temperature. The behavior of the probe cannot be calibrated by simple means because the initial focus will change as the probe scans. This can be affected by a number of factors including thermal drift, field curvature, and the structure of the sample. However, the heating portion of the signal trace provides information about how the signal changes with temperature. Using the knowledge that the pump pulse is sufficiently short that the temperature will increase at a constant rate, this part of the signal trace can be used to crudely calibrate the probe thermometry. The degree of calibration that can be accomplished depends on how many data points can be measured during the short pulse. A two-point calibration—one before and one after the pump pulse—reveals whether the heating improved or degraded the focus. Adding a third point provides information about the degree of linearity of the probe thermometer. By correcting for the nonideality of the probe thermometry, this method is a necessary step towards a technique that could measure the quantitative chemical composition of the sample.

Figure 4A:
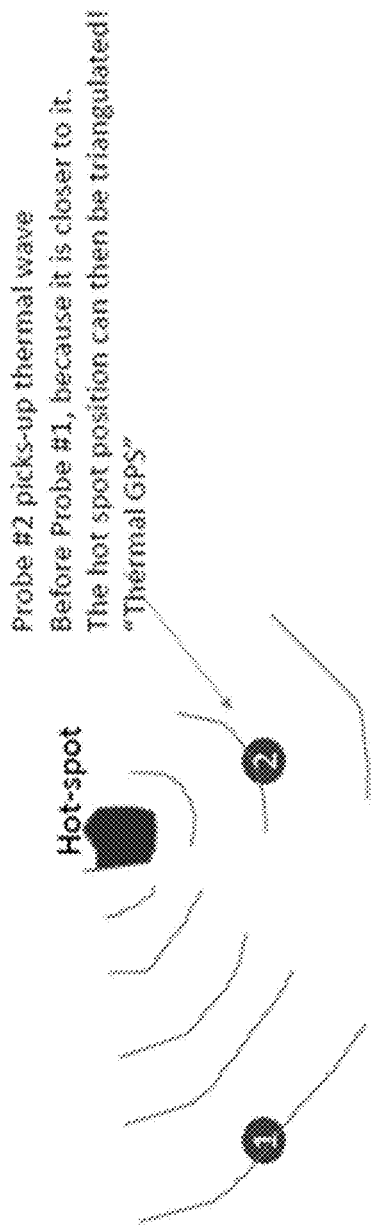
FIG. 4A is a cartoon representation depicting thermal waves emanating from a highly absorbing inclusion—the "hotspot." The differing delay between probe locations 1 and 2 permits the triangulation of the hotspot.
Figure 4B:
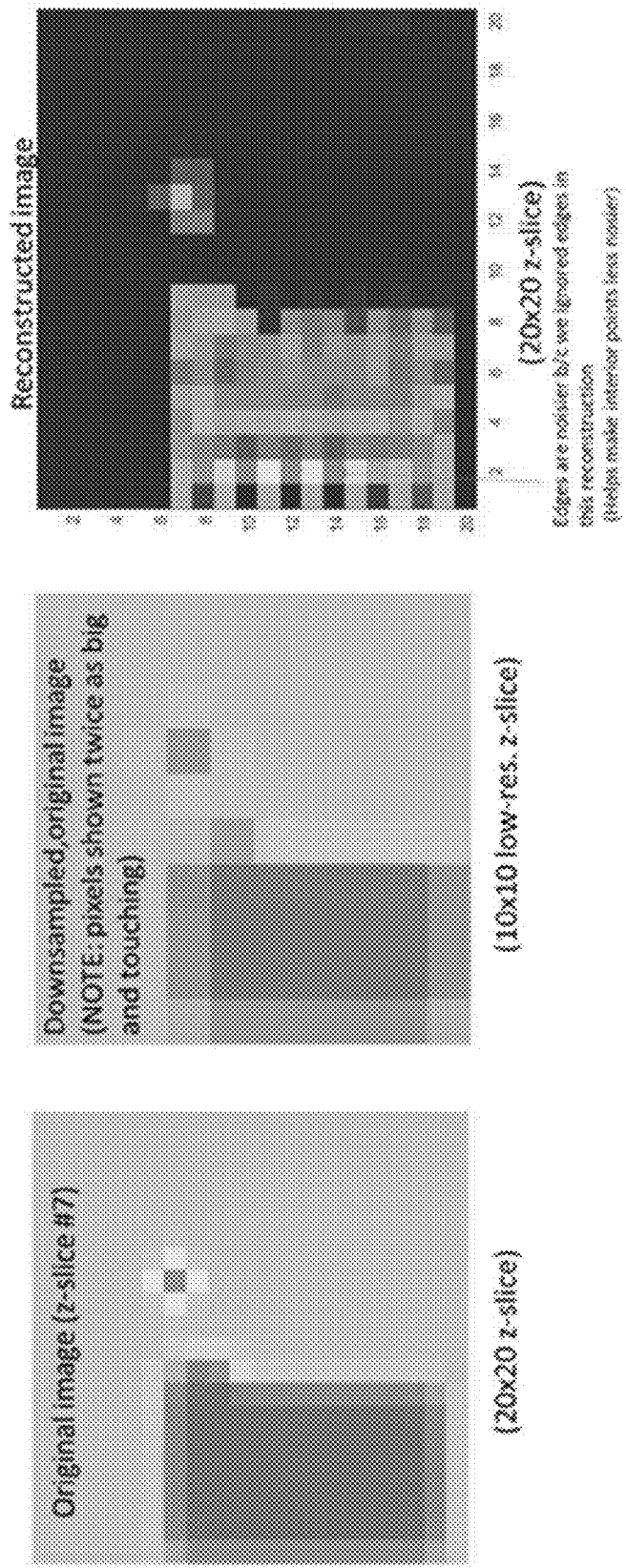
FIG. 4B shows the results (right) using the Photothermal GPS method to reconstruct the ground truth (left) from the down-sampled image (middle).

2) Photo-thermal GPS—At timescales greater than $\tau_{res}$, appreciable heat can flow between pixels. Neighboring regions of high absorption will manifest in the signal trace as a delayed peak. This implies that it may be possible to undersample the image, and then analyze the signal trace at a sparse array of points to interpolate the intermediate points, "Upsampling." Although the potential of this method is limited because the signal weakens as it radiates out from the source, if this method allows one to interpolate every other point in practice, that amounts to an 8-fold increase in image acquisition rate for 3D imaging. FIGS. 4A and 4B shows the results of some simulations of using this method to upsample an image, which we call "photo-thermal GPS" because it uses a similar approach to localize the origin of a signal by triangulating based on time-lag (FIG. 4A). A test of photothermal GPS on synthetic data is presented in FIG. 4B. Although this is a very early attempt, the results are promising. A regularization step and other improvements can be added after doing some tests on experimental data. Even when the image is fully sampled, this method can be used reduce the uncertainty present in the image since measuring neighboring points provides "additional" information that one wouldn't have had if one had measured a solitary point. The size of the convolution kernel in photo-thermal GPS is set by the thermal conductivity of the sample. This parameter can either be provided a priori by the user, if the nature of the sample is known. For example, in biological cells, the water content is very high so the conductivity can be approximated as that of water. In samples where multiple phases or analytes exist and where the conductivity differs by a lot between these phases, it is possible (though time-consuming) to make an initial estimate of the average conductivity using the measured points and including conductivity as one of the parameters to be optimized. Furthermore, in all cases, one or more, iteration step(s) can be performed in which the thermal conductivity is determined for each analyte (most likely using a small subset of the image) and then the photo-thermal GPS procedure is applied using the modified conductivity values. In this case, instead of using the Green's function kernels, the convolution is applied using the Laplace operator and average thermal conductivity in each sampled point (derived based on analyte concentration from the previous iteration step).

Assertion 6—Concentration is Proportional to the OSIRIS Signal Allowing Spectral De-Mixing, Preferably NMF, to be Used to Extract Concentration Maps In the full embodiment, a static OSIRIS image is measured in 5 dimensions—3 spatial dimensions, the time delay relative to the pump pulse, and the infrared pump frequency. For video imaging, there is, of course, an additional time (frame) dimension. With 5 or 6 dimensions, the raw dataset is a challenge to even visualize in a meaningful way. In general, the raw data is much too complicated to provide the intuitive understanding that makes imaging techniques so desirable. The raw data of MIP shares this impenetrable quality, especially when the sample is a priori unknown. Instead of focusing on the raw dataset, the goal of either technique, or indeed any chemical microscopy technique, should be to infer the spectrum and locations (concentration map) of each analyte.

That the raw data is so unintuitive, and the inference algorithm so indispensable, means that the inference algorithm is intimately tied to the technique. That the concentration cannot be straightforwardly inferred from the MIP data is the fatal flaw of that technique. However, the inference is tractable in OSIRIS since the OSIRIS signal is proportional to the concentration and absorption. This linear behavior opens the door to leverage existing matrix-based techniques. Since this reconstruction is quite nontrivial, it is preferable to adopt a Bayesian approach to quantify the uncertainty implicit in the data analysis. This is important, especially in research applications, to reduce the possibility of analysis artefacts or other reconstruction errors being used to draw unsubstantiated conclusions.

Thus, the first step towards inference is to write down the measurement model. The connection between $\Omega$, the concentration of an analyte $\rho_{analyte}$, and the infrared spectrum (cross-section) ($\sigma_{IR}$) is shown below:

$$\Omega = \Phi_{probe} \quad \Phi_{IR} \quad F(\text{Geometry, Thermo-optics}, \ldots) \rho_{analyte} \sigma_{IR}$$

where: $\Phi_{probe} \Phi_{IR}$ is addressed by normalization,

F(Geometry, Thermo-optics, . . . ) is addressable by calibration or future modeling, and $\rho_{analyte} \sigma_{IR}$ is a critical term for qualitative understanding. The OSIRIS signal depends linearly on the probe power $\Phi_{probe}$ and infrared power $\Phi_{IR}$. This effect can be taken care of by normalizing $\Omega$ with respect to the power of both beams. In addition, the OSIRIS signal involves a complicated proportionality factor F which depends on geometric details like the degree of optical focus and various thermo-optic properties of the sample such as the coefficient of thermal expansion (CTE), heat capacity ($C_p$), and the thermo-optic coefficient an $$\frac{\partial n}{\partial T}.$$

While F is not presently well understood, it can in principle be addressed by the calibration strategy discussed previously.

For this work, the focus is on the product of the analyte concentration and the infrared response—since it is the most critical term for qualitative understanding. The matrix form of this factor is shown below:

$$\Omega_{x\lambda} \propto M_{xa} S_{a\lambda}$$

where: $\Omega_{x\lambda}$ is Osiris data, $M_{xa}$ is the map of analytes' abundance, and $S_{a\lambda}$ is the spectra of each analyte.

In this illustrative method, the multi-dimensional OSIRIS data is "unwrapped" into a 2 dimensional matrix where the columns contain spectral information, while the rows index the spatial/temporal coordinates. The first matrix $M_{xa}$—The "mixing matrix"—is proportional to the concentration of each analyte a at each space-time coordinate x. The second matrix $S_{a\lambda}$—the "spectral matrix"—tabulates the infrared absorption spectrum of an analyte in each row. A matrix equation of this form is a common situation in signal processing and dimensionality reduction, known as the "Cocktail Party Problem." Solving this problem is often referred to as "Spectral De-mixing." The various common methods for the cocktail problem such as Principal Component Analysis (PCA), Independent Component Analysis (ICA), and Non-Negative Matrix Factorization (NMF) are essentially pre-packaged sets of assumptions about the values of M and S. Note that failure to use the right assumptions for the technique, either implicitly or explicitly, in the factorization procedure will yield absurd results. For example, PCA assumes that the spectra are orthogonal. This is counter to the physical reality of infrared spectra, since analytes often share vibrational modes that are associated with common structure elements, i.e., the C—H stretching mode. Although the "principal components" may be interesting to think about in some cases, they should NOT be interpreted as infrared spectra since the assumptions of PCA do not match the physical meaning of the infrared spectra. Of the common cocktail party methods, the most sensible assumptions for OSIRIS are those of NMF, since the infrared cross-section and the analyte concentration cannot be negative. The Bayesian version of NMF with Gaussian observation noise is shown in FIG. 5. Note that the model has remaining issues which will need to be dealt with:

- The proper number of analytes-often referred to as "model order"—is not known at the outset. This can be inferred from the data using some Bayesian model comparison. Bayesian model comparison is the theoretical foundation of Occam's razor, in the sense that it penalizes the fitting of more parameters than are necessary to explain the data.
- There is an undetermined scale factor between the concentration map (column of M) and the Spectra of each analyte. This is unimportant in this qualitative analysis. This ambiguity can be removed by matching the spectra to a library.
- There is a permutation symmetry between various components. Failure to account for this will result in overestimating the uncertainty of each element of M and S because, for example, any of the analytes could be associated with component "1" (first column of M and row of S). This can be handled by matching the components in samples from the output (posterior) distribution based on the maximum correlation.

Figure 6:
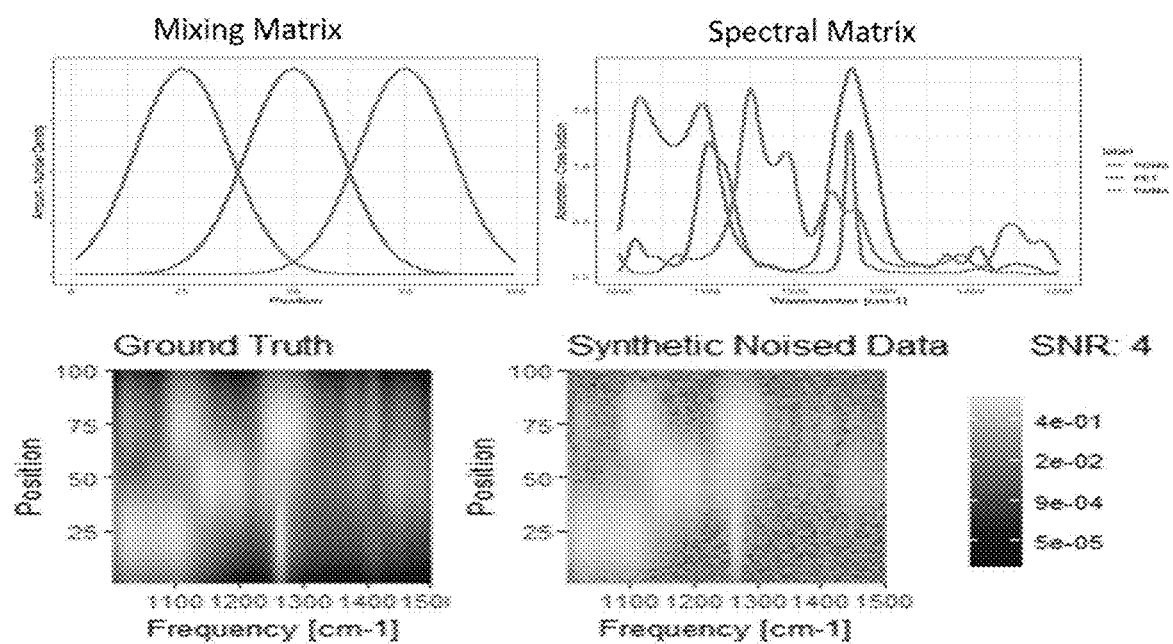
FIG. 6 shows chosen "ground truth" values for the mixing matrix (top left) and spectral matrix (top right). The ground truth spectrogram (bottom left) is compared to the synthetic (noised) spectrogram (bottom right).

The first step towards testing our inference procedure is to generate some synthetic data. We first consider an example with 2 dimensional OSIRIS data (1 spatial coordinate and the frequency coordinate). Significant noise is added to the ground truth as shown in FIG. 6. We note that the spectra and spatial distributions chosen as the ground-truth are challenging since the spectra share infrared modes and the spatial distributions have significant mixing.

The Gibbs sampling procedure following Schmidt et al., "Bayesian Non-negative Matrix Factorization" In: Adali et al., (eds) Independent Component Analysis and Signal Separation. ICA 2009. Lecture Notes in Computer Science, vol 5441. Springer, Berlin, Heidelberg (2009) https://doi.org/10.1007/978-3-642-00599-2_68 can be used. When the number of analytes is known (3 in this case), both methods generally agree on the uncertainty and perform extremely well (see FIG. 7). However, in practice, the number of analytes present in the sample will not be known a priori, and the model order will need to inferred from the data. This step is critical because models of incorrect order will necessarily involve unphysical components (spectra and spatial distributions) (see FIG. 7). The simplest method of inferring the model order is to fit a number of different models with different orders and perform some method of "model comparison."

Here model comparison is performed using the Bayesian information Criterion (BIC).

$$BIC = N_{parameters} \ln(N_{data\ points}) - 2 \ln(P(Data|\theta))$$
(Smaller is better)

For this synthetic dataset, the BIC is quite successful in determining the correct model order (See FIG. 7). Note that the BIC relies on approximations that leave it only as a heuristic measure of model quality. More computationally expensive methods of model comparison such as bridge sampling exist if the BIC turns out to not be sufficient with real data.

Figure 8:
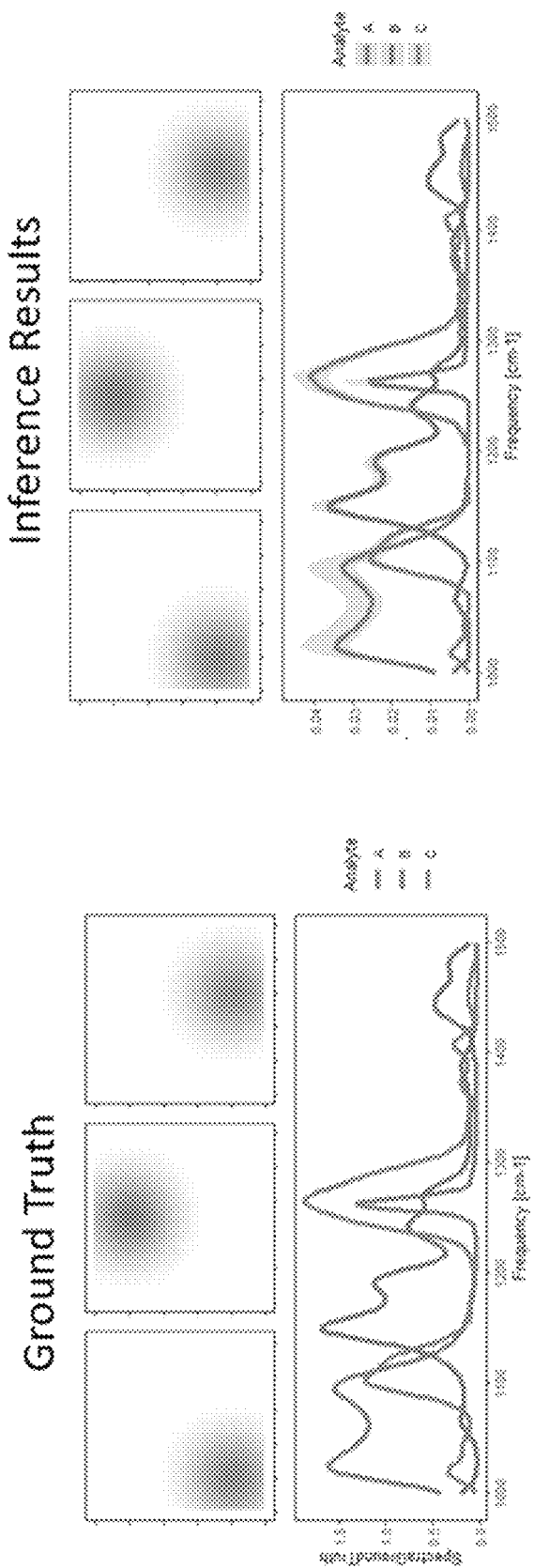
FIG. 8 shows higher dimensional inference demonstration. Analytes are localized within the sample in a Gaussian profile (top). Uncertainty in the inferred spectra is also shown (bottom).

While simple one (spatial) dimensional examples are discussed for clarity of presentation, this method is of course generalizable to multi-dimensional OSIRIS data. A proof of concept for this is presented in FIG. 8 for a 2 dimensional region with 3 analytes localized in Gaussian profiles similar to the earlier examples.

Note that we've simplified the observation model described in this section to aid in the illustration of our approach to extracting the concentration maps. A more interesting observation model (Likelihood) would be the following (Note priors are omitted):

$$\Omega_{x,y,z,t,\lambda,\Delta t} \sim (K_{thermal} \circledast)^{\Delta t} M_{x,y,z,t,a} S_{a,\lambda} + \mathcal{N}(0, \sigma_{noise})$$

Where:

| Variable | Description |
| --- | --- |
| $\Omega_{x,y,z,t,\lambda,\Delta t}$ | Measured OSIRIS Data |
| $(K_{thermal} \circledast)^{\Delta t}$ | Convolution from thermal diffusion; Inverse of photothermal GPS |
| $M_{x,y,z,t,a}$ | Concentration Map "mixing matrix/tensor" |
| $S_{a,\lambda}$ | Spectral Matrix |
| $N(0, \sigma_{noise})$ | Observation Noise |
| $K_{thermal} \circledast$ | Convolution operator for the convolution kernel K corresponding to thermal diffusion in one timestep. Depends on the thermal properties of the medium. Photothermal-GPS is the inverse operation (de-convolution). |
| $\Delta t$ | The number of timesteps since the infrared pump pulse. |
| x, y, z, t | Space-time coordinates of the image. The time index t denotes the frame for video imaging. |
| $\lambda$ | Index corresponding to the infrared pump wavelength |
| a | Analyte index |
| $\Omega$ | The OSIRIS image |
| S | The spectral matrix |
| M | The mixing matrix/tensor |
| N | Distribution of the observation noise |
| $\sigma_{noise}$ | Standard deviation of the observation noise |

Statistical inference with this model will combine photothermal GPS and spectral de-mixing in one step. The OSIRIS image could be undersampled to improve the image acquisition rate at the cost of increased uncertainty at the unsampled coordinates (see photothermal GPS section). The Bayesian approach allows any uncertainty induced by such undersampling to be quantified in a consistent way by the inference algorithm. Quantifying this uncertainty is imperative to provide confidence increasing the degree of undersampling so long as the uncertainty is acceptable to the user.

The computational cost of the convolution step is not prohibitive because the data will be sampled on the $\tau_{res}$ timescale, which means that only heat flow from near neighbor pixels likely needs to be considered. Consequently, $K_{thermal}$ will have relatively few elements. This is the regime in which it is more computationally efficient to perform the convolution in real space (as opposed to Fourier space, which is common when the kernel is large). This real-space analysis presents an additional opportunity when undersampling is used, since the convolution need only be performed at data points that were actually measured.

Figure 9:
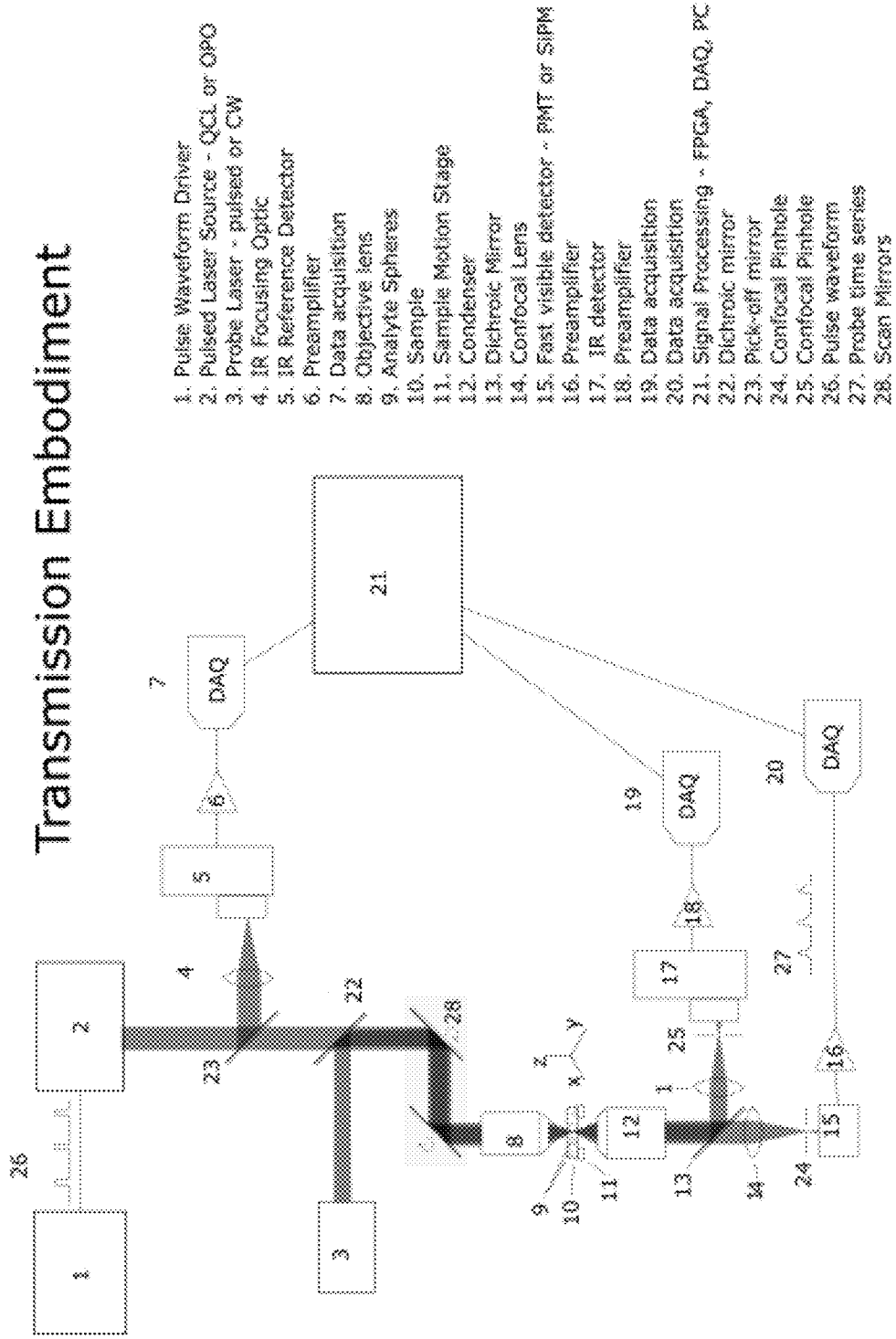
FIG. 9 is a schematic of transmission mode OSIRIS.
Figure 10:
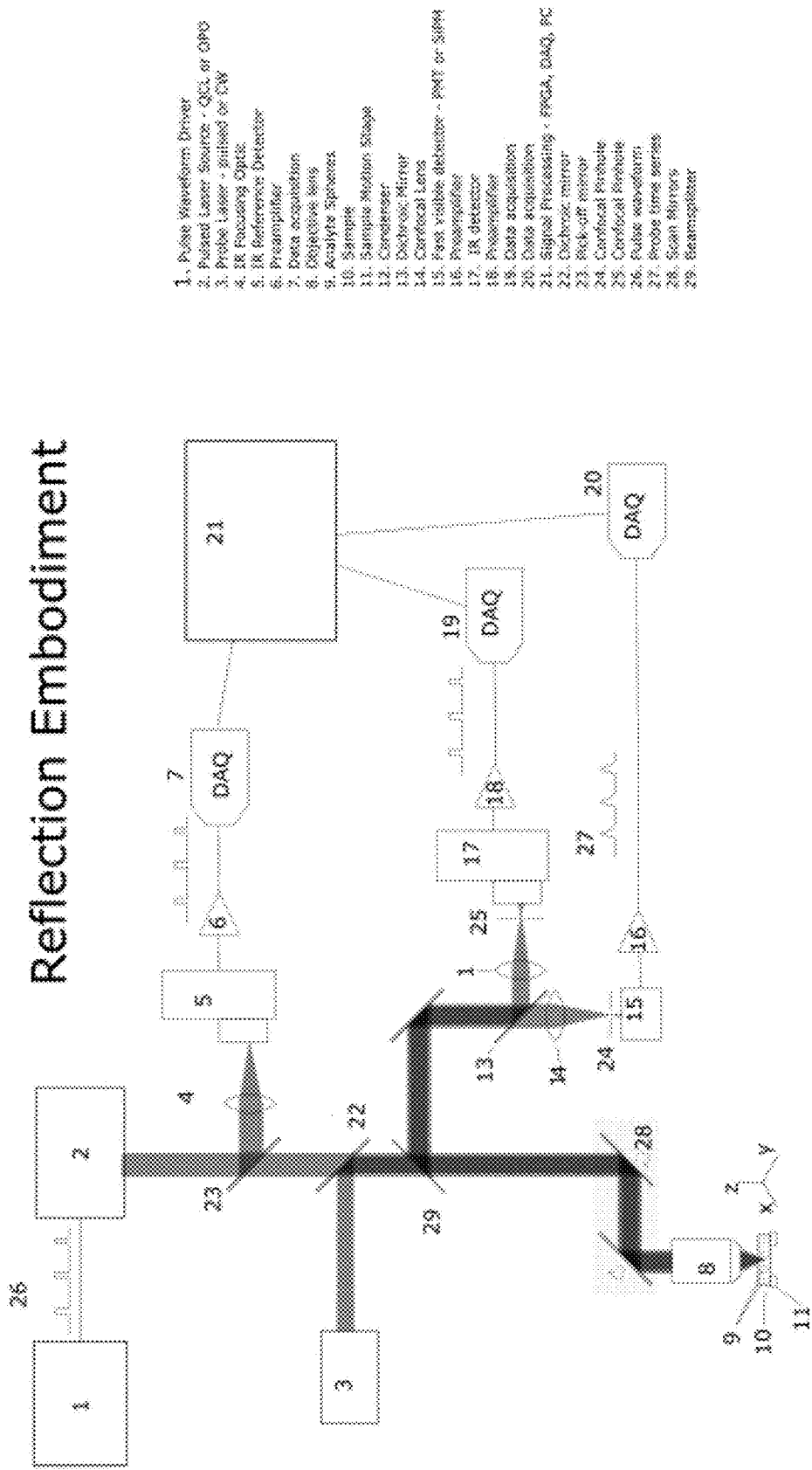
FIG. 10 is a schematic of reflection mode OSIRIS.

Both transmission and reflection embodiments have been considered, which are appropriate for different types of samples (FIGS. 9 and 10).

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method for spectroscopic imaging, comprising:
   (a) illuminating a sample with a short infrared pulse shorter than or equal to the cooling time constant of resolution scale inclusions within the sample to induce a temperature change independent of inclusion size or surface area, wherein the sample has a chemical makeup;
   (b) directing one or more probe beams to the sample such that it is incident within the area heated by the infrared pulse, and wherein the one or more probe beams has a shorter wavelength than the infrared pulse; and
   (c) measuring light that is reflected, transmitted, re-emitted inelastically, or any combination thereof for the one or more probe beam;
   (d) repeating steps (a)-(c) multiple times with varying wavelengths of the infrared pulse and while moving the sample and the one or more probe beams relative to each other to create a multidimensional infrared spectroscopic image of the sample that characterizes the chemical makeup of the sample; and
   (e) analyzing the multidimensional infrared spectroscopic image using spectral de-mixing to extract locations and spectra of distinct analytes within the sample.

2. The method of claim 1, wherein a Bayesian approach is employed to quantify the uncertainty of the data analysis.

3. The method of claim 1, wherein the spectral de-mixing comprises non-negative matrix factorization (NMF).

4. A method for spectroscopic imaging, comprising:
   (a) illuminating a sample with a short infrared pulse shorter than or equal to the cooling time constant of resolution scale inclusions within the sample to induce a temperature change independent of inclusion size or surface area, wherein the sample has a chemical makeup;
   (b) directing one or more probe beams to the sample such that it is incident within the area heated by the infrared pulse, and wherein the one or more probe beams has a shorter wavelength than the infrared pulse; and
   (c) measuring light that is reflected, transmitted, re-emitted inelastically, or any combination thereof for the one or more probe beam;
   (d) repeating steps (a)-(c) multiple times with varying wavelengths of the infrared pulse and while moving the sample and the one or more probe beams relative to each other to create a multidimensional infrared spectroscopic image of the sample that characterizes the chemical makeup of the sample; and
   (e) analyzing the multidimensional infrared spectroscopic image in the time domain to infer information about sample where the one or more probe beams are incident and the surrounding area either to reduce the uncertainty of the collected image or upsample an under-sampled image.

5. The method of claim 4, wherein a Bayesian approach is used to quantify the uncertainty.

6. The method of claim 4, wherein the time domain analysis comprises photothermal GPS (deconvolution) or its inverse operation of convolution on some model of the sample.

7. A method for spectroscopic imaging, comprising:
   (a) illuminating a sample with a short infrared pulse shorter than or equal to the cooling time constant of resolution scale inclusions within the sample to induce a temperature change independent of inclusion size or surface area, wherein the sample has a chemical makeup;
   (b) directing one or more probe beams to the sample such that it is incident within the area heated by the infrared pulse, and wherein the one or more probe beams has a shorter wavelength than the infrared pulse; and
   (c) measuring light that is reflected, transmitted, re-emitted inelastically, or any combination thereof for the one or more probe beam;
   (d) repeating steps (a)-(c) multiple times with varying wavelengths of the infrared pulse and while moving the sample and the one or more probe beams relative to each other to create a multidimensional infrared spectroscopic image of the sample that characterizes the chemical makeup of the sample; and
   (e) combining a time domain analysis with spectral de-mixing to extract concentration maps.

8. The method of claim 7, wherein the time domain analysis comprises photothermal GPS (deconvolution) or its inverse operation of convolution on some model of the sample.

9. The method of claim 7, wherein non-negative matrix factorization (NMF) is used for spectral de-mixing.

10. The method of claim 7, wherein a Bayesian approach is used to quantify the uncertainty.

11. A system comprising:
    a pulsed infrared light source;
    an optical system for generating one or more probe beams;
    means for directing the infrared light source and one or more probe beams to a sample;
    a device for moving the one or more probe beams and the sample relative to each other;
    one or more light detectors and filtering optics for the one or more probe beams;
    digitization electronics for the one or more probe beams, wherein the digitization electronics have temporal resolution greater than or equal to the cooling time constant of resolution scale objects; and
    a computer with control software to collect, process, analyze and display relevant information.

* * * * *